Figure 1:
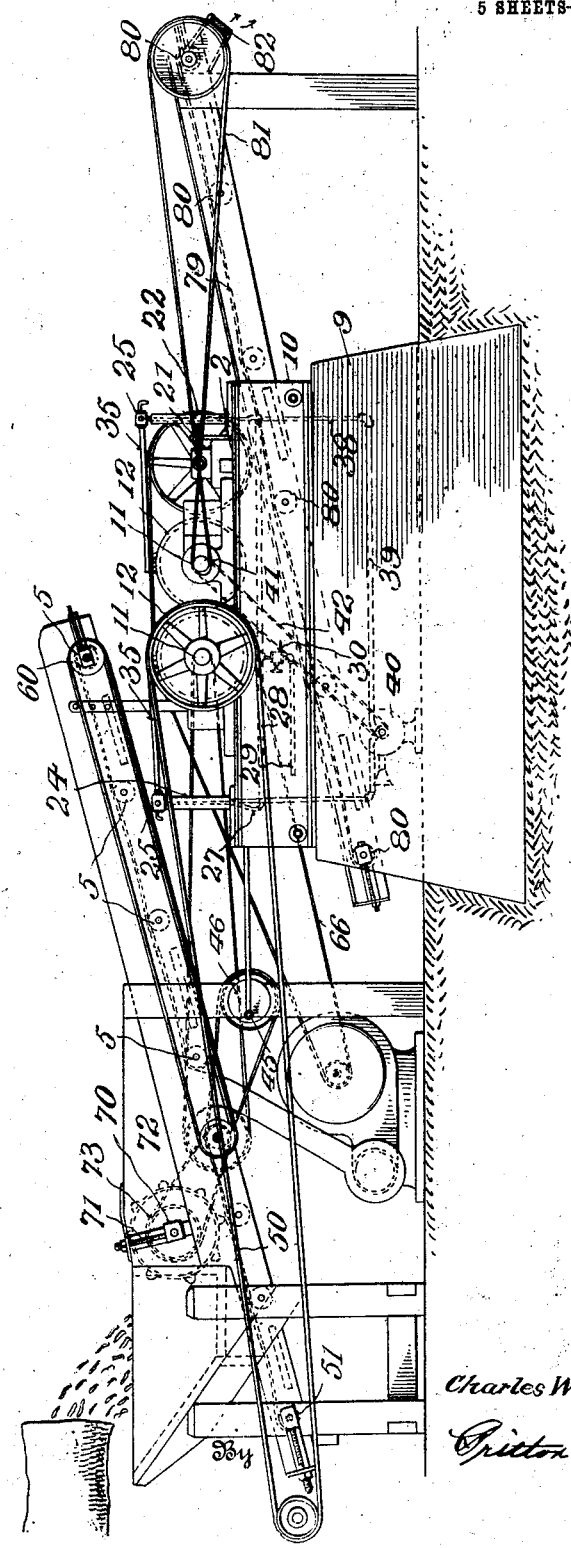

C. W. RENEAR.
GRINDING MILL.
APPLICATION FILED NOV. 13, 1909.

973,811.

Patented Oct. 25, 1910.
5 SHEETS—SHEET 1.

Witnesses

Inventor
Charles W. Renear
By
Britton & Gray
Attorneys

C. W. RENEAR.
GRINDING MILL.
APPLICATION FILED NOV. 13, 1909.

973,811.

Patented Oct. 25, 1910.
5 SHEETS—SHEET 4.

Witnesses
Helzett Murray
L. B. Baker

Inventor
Charles W. Renear
By Britton & Gray
Attorneys

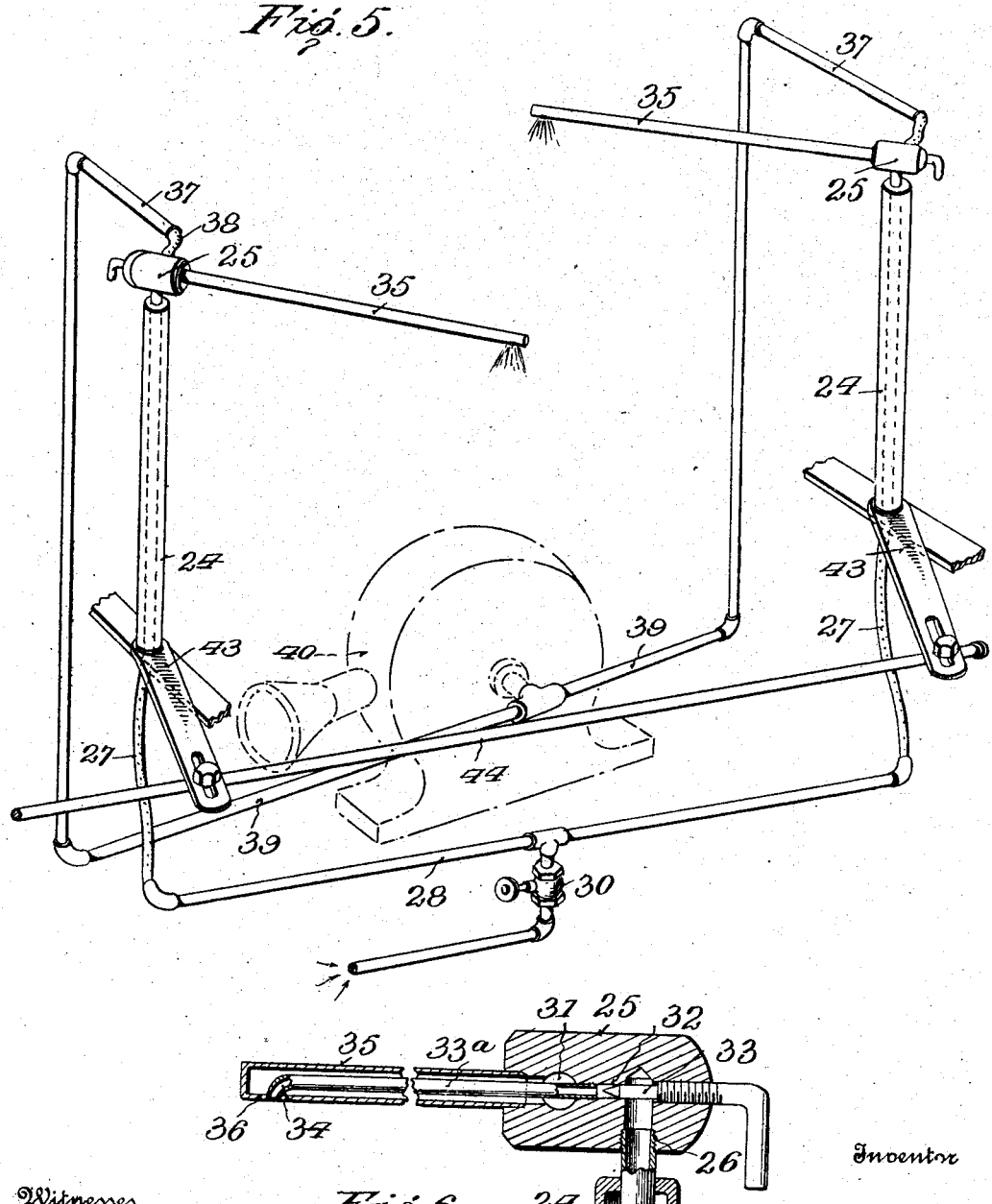

UNITED STATES PATENT OFFICE.

CHARLES W. RENEAR, OF HONOLULU, TERRITORY OF HAWAII, ASSIGNOR TO RENEAR COMPANY LIMITED, OF HONOLULU, TERRITORY OF HAWAII.

GRINDING-MILL.

973,811.  Specification of Letters Patent.  Patented Oct. 25, 1910.

Application filed November 13, 1909. Serial No. 527,802.

*To all whom it may concern:*

Be it known that I, CHARLES W. RENEAR, a citizen of the United States, residing at Honolulu, in the Territory of Hawaii, have invented certain new and useful Improvements in Grinding-Mills, of which the following is a specification.

My invention relates to certain new and useful improvements in grinding mills and particularly to a mill adapted to successfully handle the Algarroba bean, which is the product of a tree found in great quantities in the Hawaiian Islands. This bean consists of a pod containing little hard seeds, the seeds themselves constituting fully one-half of the food value of the entire bean but which if not properly crushed or ground will not be properly digested by stock to which it is fed and will produce deleterious results. I have produced grinding rolls which will properly grind and crush this bean, which rolls form the subject matter of my copending application Serial No. 485,196, filed March 22, 1909 and I shall refer thereto in a description of the construction of these rolls. In the use of these rolls I find that if the beans have been kept before grinding, they will stick to the rolls even as constructed as described in my application referred to. I have further discovered that by spraying the rolls with lime water this sticking tendency will be entirely overcome. I have also discovered that in order to prevent the beans when crushed from absorbing sufficient lime water to cause them to sour, it is necessary to spray the rolls with a vapor in order not to supply too great an amount of water and that the water in the form of vapor will operate to entirely prevent the beans sticking on and between the rolls.

With the form of rolls shown in my application referred to, I find that it is necessary to separate all foreign matter from the beans before they pass into the roll as if any scrap of metal or stone pass between the rolls with the beans, the rolls would probably be broken, due to the fact that this foreign matter will lodge in the pockets which exist therein. I therefore find it necessary to provide my mill with a separating device which is peculiarly adapted to separate the foreign matter from the Algarroba beans. This is due to the fact that these beans are of a peculiar shape and of such a weight as to permit of their being handled in a way that other materials cannot be. I have also discovered that for the successful operation both of the cleaning device and of the rolls it is necessary that the beans be fed at a constant rate and I have devised a mechanism for controlling and regulating the feed of the beans.

Other improvements which I have made will be pointed out hereafter.

With this and other objects in view, my invention consists in certain constructions, combinations and arrangements of parts, the preferred form of which will be first described in connection with the accompanying drawings and then the invention particularly pointed out in the appended claims.

Figure 2:
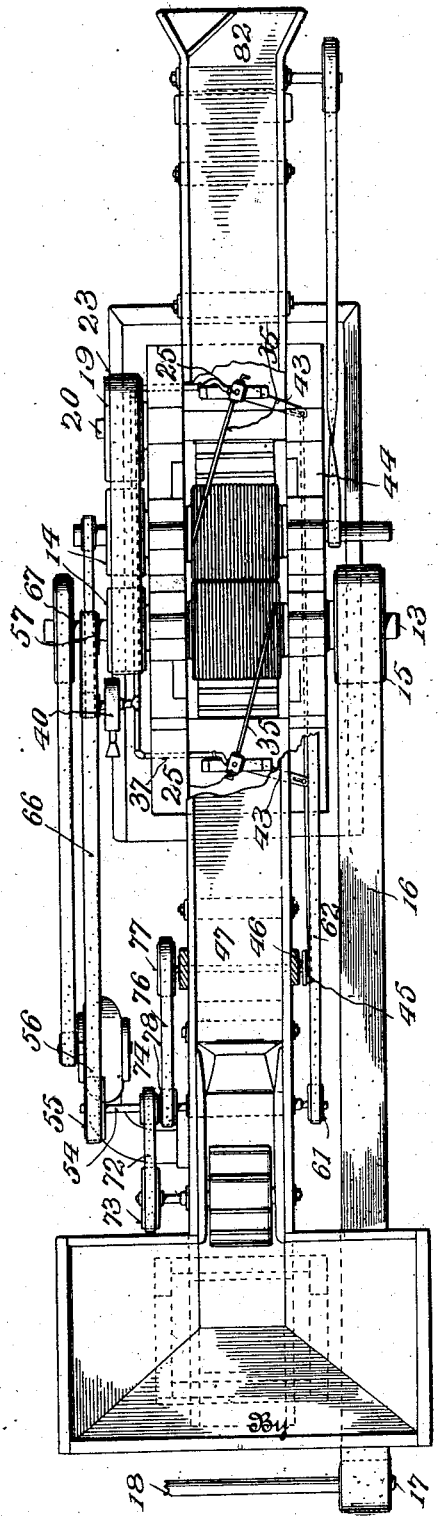
Figure 3:
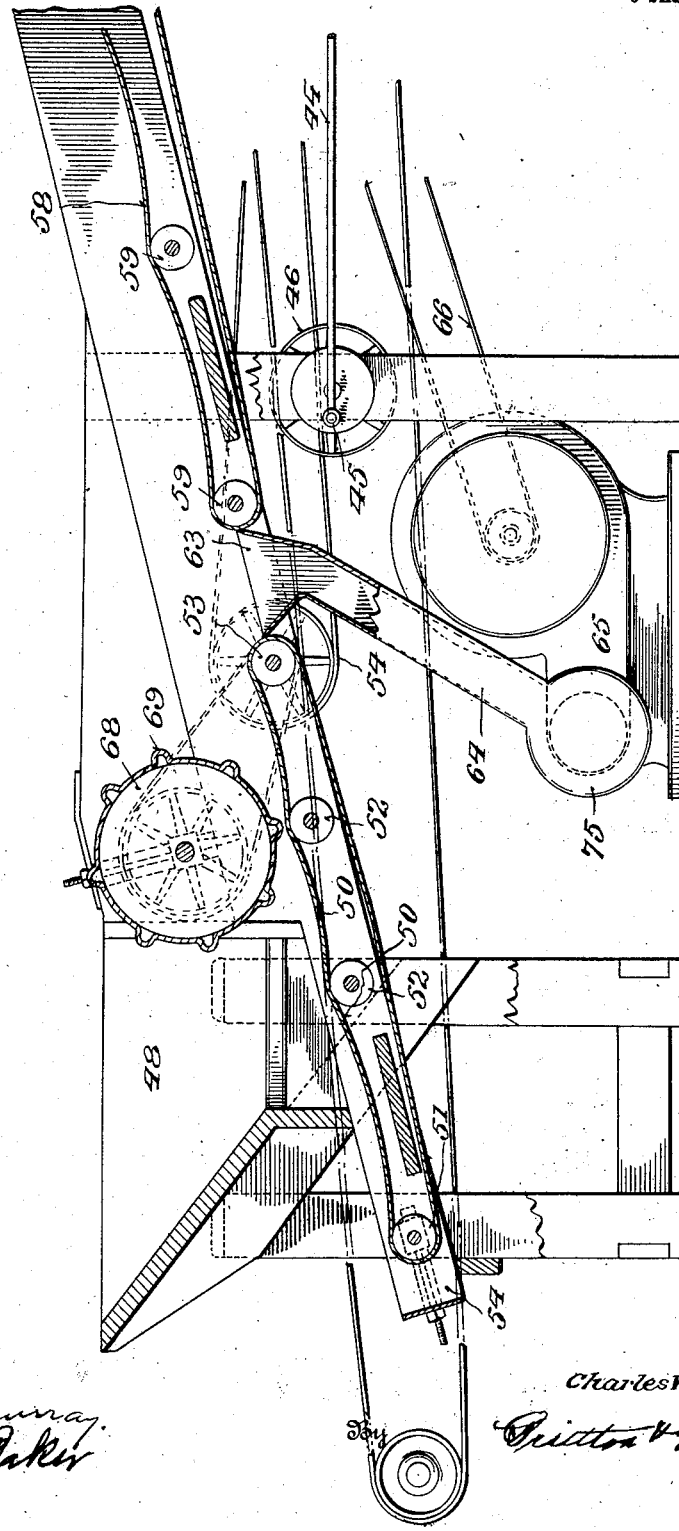
Figure 4:
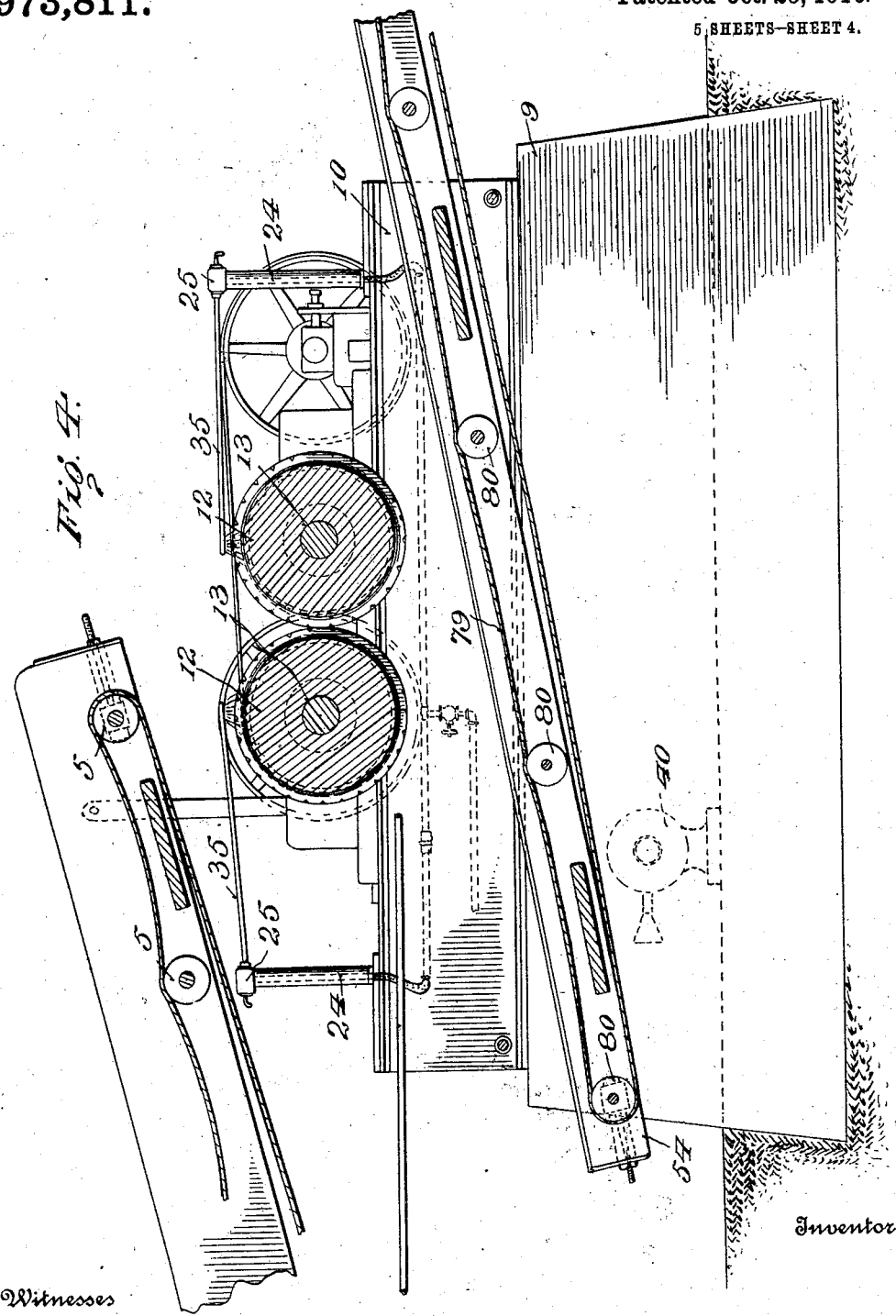

Referring to the drawings wherein the same part is designated by the same reference numeral wherever it occurs, Figure 1 is a side elevation of the complete grinding mill. Fig. 2 is the top plan view partly broken away. Fig. 3 is a central longitudinal section showing the left hand end of the machine. Fig. 4 is a central longitudinal section showing a continuation of the machine from that shown in Fig. 3. Fig. 5 is a detail perspective view of the sprinkler mechanism, showing the same separated from the machine. Fig. 6 is a central longitudinal section of a sprinkler head.

Mounted upon the frame 9 is a second frame 10 also of rectangular form and on which are mounted the journal boxes 11 for the grinding rolls 12 which rolls are preferably constructed in accordance with my invention as disclosed in my pending application referred to, and for a specific description of the construction and operation of these rolls reference is made to said application.

The bearing shafts 13 of these rolls are extended on one side and carry the pulleys 14, the shaft 13 of one of the rolls being also extended beyond the other bearing where it carries a driving pulley 15 connected by a belt 16 to a pulley 17 on a suitable bearing-shaft 18. Beyond the pair of pulleys 14 and in a line therewith, I preferably provide a third pulley 19 mounted on shaft 20 which shaft is mounted in adjustable journals 21 which may be adjusted toward and away from the journals 11 by means of the set screws 22 in any suitable manner.

23 is a belt which as best shown in Fig. 2 has its upper run extending over all three of the pulleys 14, 14 and 19 and its lower run looped over the middle pulley 14, whereby the two rollers 12 will be driven in opposite directions as is necessary. By means of the adjustable shaft 20 for the pulley 19, the slack in this belt may be taken up and the tension of the pulleys varied as desired, so that when too great resistance is offered to the grinding rolls the belt may slip and thus lessen the chance of breaking the teeth on the grinding rolls.

Projecting vertically at opposite ends of the frame 10 are the hollow standards 24 on the upper ends of each of which are rotatably mounted the heads 25. Each head 25 is provided with an opening 26 extending into the same in line with the standard 24, and 27 is a pipe preferably of rubber which extends from the recess 26 to one end of a pipe 28 connected to a suitable supply pipe 29 having a valve 30 to control the flow of liquid from the pipe 29 to the pipe 28. The pipe 29 is connected to any desired source of liquid supply and the liquid which I have found to be best adapted is lime water.

Each of the heads 25 is provided at one end with a recess 31 which is connected to the recess 26 by the reduced opening 32, and 33 is a needle valve operating in the passageway 32 and controlling the flow of liquid from the recess 26.

33ª is a pipe extending out from the recess 32, said pipe terminating in a downturned end 34. As will be seen from Fig. 6 the pipe 33ª extends centrally through the recess 31.

35 is a pipe threaded into the outer end of the recess 31 and surrounding the pipe 33ª. The pipe 35 is closed at its outer end and in its side is provided with an opening 36 through which the downturned end 34 of the pipe 33 projects, said opening 36 being slightly larger in diameter than the end 34.

37 is a pipe extending to the side of the head 25 and connected to the recess 31, by a section of hose 38. The pipe 37 connects with one end of a pipe 39 which in turn is connected to an air blower 40 driven from the pulley 41 on the shaft 13 by means of the belt 42. The blower 40 is of any ordinary or desired form and is for the purpose of forcing air into the pipe 35 from which it escapes around the reduced end 34 of the lower water pipe 33ª, thus forming an atomizer. The pipes 33ª and 35 are of such a length that they will extend out from the head 25 over the axial portion of one of the rolls 12. In order to oscillate these pipes over the rolls to distribute the vapor delivered therefrom over the entire surface of the rolls, I provide each of the standards 24 near its base with a laterally extending arm 43 which is connected to a rod 44 having one end connected to a crank pin 45 carried by disk 46 mounted on a shaft 47 driven in a manner hereinafter described. From an inspection of Fig. 2 it will be seen that upon the rotation of the shaft 47 the free ends of the pipes 35 will be oscillated back and forth over the rolls 12.

The beans to be ground are dumped into a hopper 48 of any desired form mounted upon a frame 49 and pass on to a conveyer belt 50 running on supporting rolls 51, 52 and 53, the rolls being mounted in a frame 54 extending beneath the lower end of the hopper 48 and up over the grinding mechanism just described. The conveyer belt 50, however, only extends from the adjustable roll 51 to the roll 53 which is mounted on a shaft 54' carrying a pulley 55 connected by a belt 56 with a pulley 57 on the shaft 13. 58 is a second conveyer belt running over supporting rollers 59 mounted in the frame 54. The upper end of the belt 58 runs over an adjustable driving roller 60 driven from the pulley 61 on opposite end of the shaft 54' from that carrying a pulley 55 by means of the belt 62. Between the adjacent ends of the conveyer belts 50 and 58 a space is left into which projects the funnel-shaped opening 63 of the pipe 64 extending from a blower 65 of any ordinary or desired construction, said blower being driven by belt 66 from the pulley 67 on the shaft 13.

68 is a wheel provided with a series of ribs 69 extending longitudinally thereof and projecting axially therefrom. This wheel is mounted in bearings 70 which are adjustable by means of the set screws 71 toward and away from the belt 50 whereby the distance between the wheel and the surface belt may be varied as desired. This wheel is driven by means of a belt 72 running from a pulley 73 on one end of the shaft carrying said wheel to a pulley 75 on the shaft 54.

In the foregoing description it will be seen that when the Algarroba beans are dumped in quantity in the hopper 48 they will be caught by the conveyer belt 50 and carried forward. The ribbed wheel 68 is, however, driven in the opposite direction from that of the conveyer belt so that the ribs on the wheel will operate to spread the beans out in a thin, even layer, the thickness of the layer depending upon the distance away from the belt to which the wheel is adjusted. As the beans reach the end of the travel of the conveyer belt 50 they will be struck by the blast of air issuing from the pipe 63. This blast is of such strength that the beans will float over the mouth of the funnel and on to the belt 58, all heavy material such as stone, scraps of iron or the like, will, however, fall into the mouth of the funnel and drop into a chamber 75' formed in the side of the fan or blower 65. The light particles of dirt or trash will be blown upward and out of the mass of beans. The beans after having been cleaned by the blower will pass upwardly on the belt 58 and be dumped off the end of the belt between the rolls 12 where they will be crushed in the manner fully set forth in my pending application previously referred to. The shaft 47 carrying the disk 46 and the crank pin 45 is driven by means of a belt 76 passing around the pulley 77 on the shaft 47 and also around the pulley 78 on the shaft 54'. After the beans have been ground in the manner described, they drop upon a conveyer belt 79 running over supporting rolls 80 which preferably and as shown are longitudinally adjustable in the frame 81 in order to vary the tautness of the belt. At the upper end of the frame 81 I provide a hopper 82 into which the ground beans fall as they pass off the end of the conveyer belt 79.

I realize that considerable variation is possible in the details of construction and arrangement of parts without departing from the spirit of my invention, and I therefore do not intend to limit myself to the specific form shown and described.

What I claim as new and desire to secure by Letters Patent is—

1. In a grinding machine for Algarroba beans and the like, the combination with a pair of rolls having grinding surfaces thereon, said rolls running in contact with each other, means for delivering an atomized liquid spray directly to the periphery of each of said rolls, means for oscillating said atomizing means to move said atomizing means longitudinally of said rolls whereby to directly moisten the entire surface of each roll before it meets the material to be ground.

2. In a grinding machine for Algarroba beans and the like, the combination with a pair of rolls having grinding surfaces thereon, said rolls running in contact with each other, of a spraying pipe pivoted at the side of each roll so that the spray-delivering end may be moved over the roll from end to end thereof, arms connected to said pipes, and a rod joining said arms and connected to the driving mechanism of the mill for oscillating said spraying pipes.

3. In a grinding machine for Algarroba beans and the like, the combination with a pair of rolls having grinding surfaces thereon, a standard extending upwardly opposite the middle of each roll, a head mounted upon said standard, a liquid supplying-pipe extending through said standard to said head, an air-supplying pipe extending to said head, a pipe extending out from the head and terminating over its respective roll and connected to the liquid supplying-pipe, a second pipe surrounding said last mentioned pipe and connected to said air-supplying pipe whereby an atomizer is formed at the free end of said combined pipes, a valve in the head for controlling the supply of liquid, means for supplying compressed air to the air-pipe and means for oscillating the free end of said pipes lengthwise of said roll whereby the surface of the roll is moistened before meeting the material to be ground.

4. The combination with a pair of rolls adapted to grind Algarroba beans and the like, of a conveyer belt mounted in position to deliver the beans to be ground between the rolls, a second conveyer belt mounted in line with the first conveyer belt with the adjacent ends of the belts separated, both belts being upwardly inclined toward said rolls, a nozzle mounted between the adjacent ends of the belts, a blower for supplying air under pressure to the nozzle, and means for driving the grinding rolls, the conveyer belts and the air blower.

5. The combination with a pair of rolls adapted to grind Algarroba beans and the like, of a conveyer belt mounted in position to deliver the beans to be ground between the rolls, a second conveyer belt mounted in line with the first conveyer belt with the adjacent ends of the belts separated, a nozzle mounted between the adjacent ends of the belts, a blower for supplying air under pressure to the nozzle, a roller having ribs running longitudinally thereof and extending axially therefrom, said roller being mounted over the top of the second-mentioned conveyer belt, means for driving the conveyer belts, the blower, and the roller, the said means operating to drive the roller in the opposite direction from the movement of the conveyer belt over which it is mounted.

In testimony whereof I have affixed my signature in presence of two witnesses.

CHARLES W. RENEAR.

Witnesses:
A. LEWIS, Jr.,
OTIS GUILD.